United States Patent [19]
Stamm

[11] 3,760,642
[45] Sept. 25, 1973

[54] CLUTCH-PINION FOR TIMEPIECES AND THE METHOD OF MAKING SUCH CLUTCH-PINIONS, INCLUDING A MILLING CUTTER USED IN THE METHOD

[75] Inventor: Heinrich Stamm, Grenchen, (Canton of Soleure), Switzerland

[73] Assignee: Eta A.G. Ebauches-Fabrik, Grenchen, Switzerland

[22] Filed: Apr. 25, 1972

[21] Appl. No.: 247,370

[30] Foreign Application Priority Data
Apr. 28, 1971 Switzerland.......................... 6242/71

[52] U.S. Cl. .................................... 74/432, 74/417
[51] Int. Cl. .......................... F16h 55/00, F16h 1/14
[58] Field of Search..................... 74/417, 423, 432

[56] References Cited
UNITED STATES PATENTS
1,143,558   6/1915   Templeton............................ 74/432

3,396,596   8/1968   Fischer................................ 74/432

*Primary Examiner*—Leonard H. Gerin
*Attorney*—Richard K. Stevens et al.

[57] ABSTRACT

Clutch-pinions for timepieces, which are generally cylindrical and include crown toothing in an annular crown on one end, are made in a process including hobbing the crown toothing in an unfinished clutch-pinion blank using a milling-cutter which has one or more revolutions of helical cutting teeth, and rotating the milling cutter about an axis which is substantially perpendicular to the axis of the unfinished blank, thereby providing the clutch-pinion with crown teeth whose profiles match the profile of the spacing between the milling-cutter teeth.

5 Claims, 8 Drawing Figures

CLUTCH-PINION FOR TIMEPIECES AND THE METHOD OF MAKING SUCH CLUTCH-PINIONS, INCLUDING A MILLING CUTTER USED IN THE METHOD

The clutch-pinions used in horological movements, and in particular in watch movements, comprise, as shown in pinion 1 of FIG. 1, a crown toothing 2 in which the tooth profile is of a trapezoidal shape as shown in FIG. 2. These teeth are cut tooth-by-tooth according to conventional machining methods. It is well known that this crown toothing normally meshes with the setting-wheel such as the one denoted by 3 in FIG. 1. The axis of this setting-wheel is perpendicular to that of the clutch-pinion, the meshing conditions are adverse, and therefore the outer edges of teeth 2 are subjected to wear which causes burrs 4, as shown in FIG. 3, which gradually grow outward. To remedy this drawback, attempts have been undertaken to correct the setting-wheel toothing by shaping the ends of the teeth into bevels 5. However, meshing conditions are only partly improved thereby. Also, attempts have been undertaken to make clutch-pinions with crown-toothing such that the tooth profile will differ from the conventional trapezoidal shape, particularly by correcting the clutch-pinion with a differently profiled milling-cutter after the teeth have been cut, to achieve sloped tooth edges. This process achieves a crown-toothing which properly meshes with the setting-wheel; however, it entails increased complexity in the process of manufacture, and therefore increases the cost of clutch-pinions.

The present invention addresses itself to the task of providing horological clutch-pinions, and in particular watch clutch-pinions, which are equipped with crown teeth capable of properly meshing with the setting-wheel without requiring correction of the latter's teeth, and to obtaining this result swiftly and economically.

To that end, the object of the present invention is a manufacturing process for a horological clutch-pinion, characterized in that, beginning with an unfinished movement-blank that is provided with an annular crown axially projecting at one of the blank's ends, the clutch-pinion's crown-teeth will be cut by means of a milling-cutter, the teeth of which are arrayed along a helical thread extending at least over one revolution and at most over two and a half revolutions around the milling-cutter axis, and where this axis is kept in a plane normal to that of the axis of the blank.

Another object of the invention is a clutch-pinion characterized in that its crown toothing comprises teeth whose cross-sections through a plane normal to the pinion axis approximate the shape of isosceles triangles, where the vertex between the two equal sides is located near the axis of the blank and where the two outer angles smoothly join the cylindrical lateral surface of the pinion.

Still another object of the invention is a milling-cutter for implementing the process, characterized in that it comprises teeth arrayed along a helical thread extending throughout at least one revolution and at most throughout two and a half revolutions around the milling-cutter's axis.

Milling-cutters are known in which the teeth are arranged along a two-pitch or two-turn helical thread, but such are typically used for milling key grooves into the conical ends of certain arbors. The milling of meshing teeth by hobbing requires entirely different conditions.

The attached drawings illustrate one manner of implementing the process of this invention, and show the details of a clutch-pinion obtained according to this process.

Figure 1:
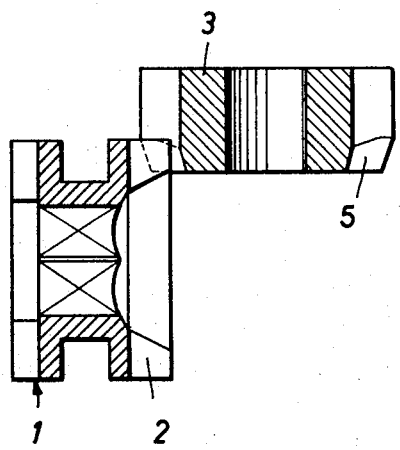
FIG. 1 is a section of a clutch-pinion and of a setting-wheel, both conventional, wherein the cross-section passes through the plane defined by these axes of these parts.

As seen from FIG. 4, clutch-pinion 6, an embodiment of which will be described below, may mesh in with a setting-wheel 7. The latter's toothing 8 comprises straight teeth with identical and constant profiles parallel to the axis of the setting wheel. In order to obtain clutch-pinion 6, one begins with an unfinished blank provided with a conventional central square aperture 9, the latter being coaxial with the lateral cylindrical surface 10. The unfinished blank further comprises rectangular-profiled groove 11 and a circular crown which might, for instance, be of rectangular profile and is bounded on the outside by cylindrical face 10. The extremity of groove 11 is hobbed into toothing 12. The Brequet toothing 13, located at the other end of the clutch-pinion may be made before or after the milling of toothing 12, and the same applies to the frustrum-shaped surface 14 that extends from the bottom or root of the toothing to the square opening 9.

Figure 4:
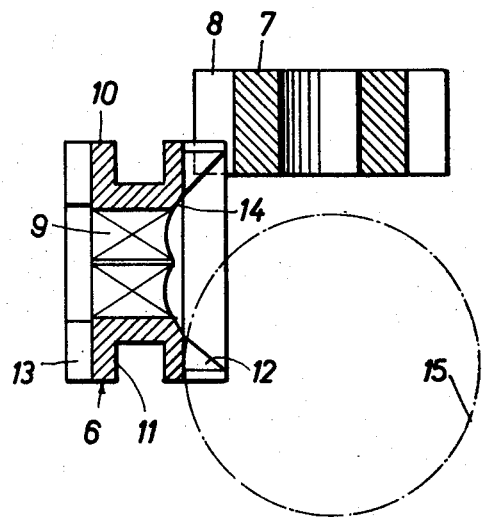
FIG. 4 is a view similar to FIG. 1, in which the clutch-pinion is shown embodying objects of the invention.
Figure 5:
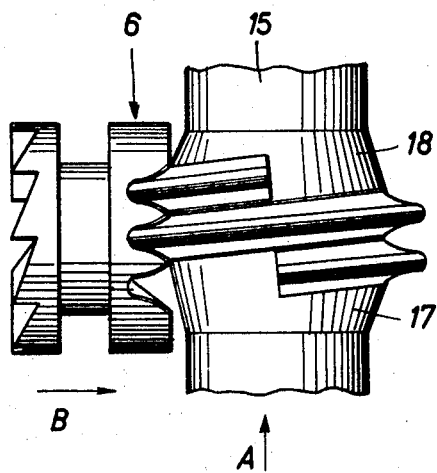
FIG. 5 is a diagrammatic elevation of the clutch-pinion of FIG. 4 and of the milling-cutter used for hobbing the crown toothing.
Figure 6:
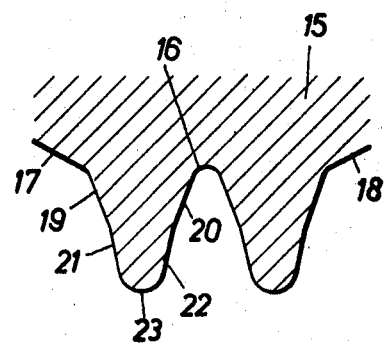
FIG. 6 is a section on a larger scale of the milling-cutter teeth of FIG. 5.
Figure 2:
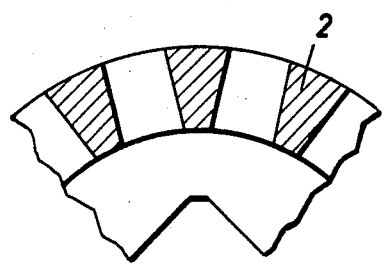
FIGS. 2 and 3 are fragmentary sections of the clutch-pinion of FIG. 1, when new and after wear, respectively.
Figure 3:
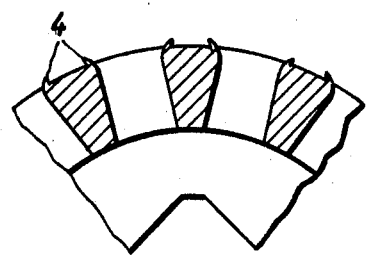

The teeth making up toothing 12 are hobbed in a single operation by means of milling-cutter 15 (FIGS. 4, 5 and 6). The axis of the milling-cutter lies in a plane which is normal to the axis of the unfinished blank that is to be machined. This unfinished blank is put into the spindle of a parts-holder or chuck so that it may be rotated at a constant speed corresponding to one pitch while the milling-cutter performs one complete revolution. The milling-cutter is put into the grip of the machine's runner or tool-holder so that it may be moved if necessary during hobbing, its axis remaining in a plane perpendicular to that of the blank. Milling-cutter displacement during hobbing may take place in a direction normal to the axis of the blank or parallel to it, as needed. In the latter case, the milling-cutter axis always remains at the same distance from the axis of the blank. Thus it may be at a distance equal to or slightly less than the radius of the lateral face 10, and the milling-cutter is moved toward the blank to progressively machine the hollows between teeth 12.

FIG. 5 shows the relative positions of pinion 6 and milling-cutter 15 during hobbing. One observes that this cutting-miller comprises a number of teeth diagrammatically shown in FIG. 5, and arrayed helically around the milling-cutter throughout the length of two pitches or thread-turns. Thus, the milling-cutter may comprise two sets of 12 teeth, each spaced 1/12 of a pitch in the axial sense from the next, and regularly arrayed on the two turns as desired and shown in FIG. 5. In a variation, the milling-cutter teeth might extend along only one revolution, or, to the contrary, along an arc exceeding two revolutions but less than two and a half revolutions. Indeed the observation has been made that the described process did allow achieving in one operation a crown-toothing correctly meshing with the setting-wheel, provided that the length of the thread made up by the milling-cutter's teeth be within the limits indicated above. As is clear, the diagrammatic arrangement illustrated in FIG. 5 shows milling-cutter 15 rotating counter-clockwise when it is viewed in the direction of arrow A, and clutch-pinion 6 also rotates counter-clockwise when it is viewed in the direction of arrow B.

FIG. 6 shows the tooth profiles obtained with milling-cutter 15. The two tooth-revolutions are attached to the cylindrical component, which is the milling-cutter's shaft, by two frustrum-shaped surfaces 17 and 18. Each tooth profile is made up of two straight-line segments 19 and 20 which are symmetrical with respect to a plane which is perpendicular to the milling-cutter axis and to the addendum or top of the pinion teeth. Each tooth profile also comprises two straight line segments 21 and 22 which are also symmetrical with respect to the same plane, but make a larger angle with the axis of the milling-cutter than do segments 19 and 20. Segments 21 and 22 are joined at their ends by a rounded surface 23 which shapes the dedendum or bottom of the pinion tooth.

Figure 7:
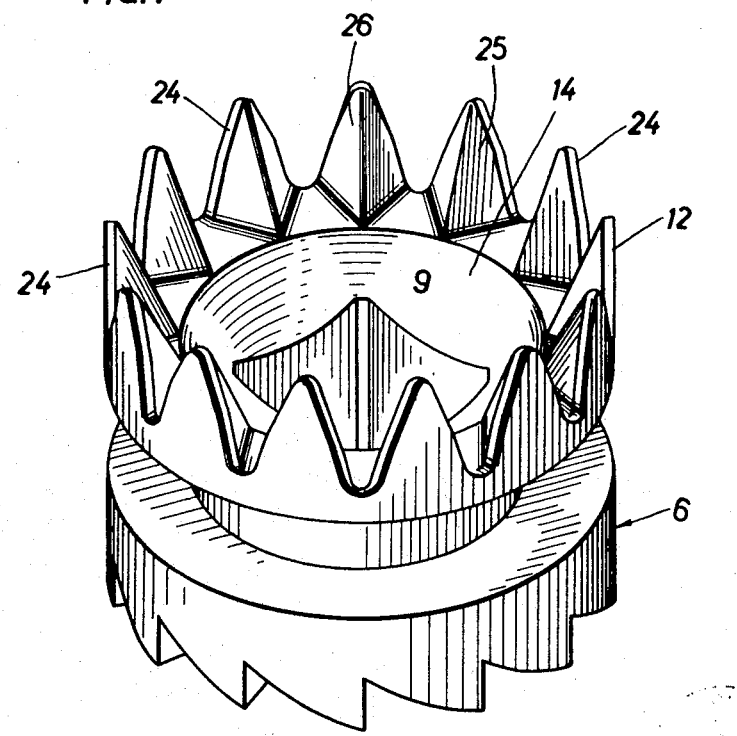
FIG. 7 is a perspective view of the clutch-pinion of FIG. 4.
Figure 8:
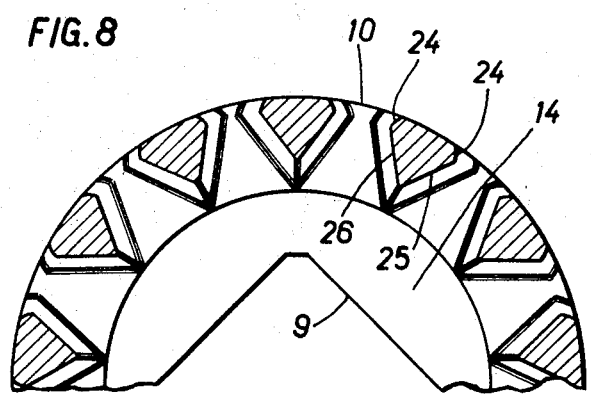
FIG. 8 is a section of this clutch-pinion through a plane normal to its axis and passing at mid-height through its crown-toothing.

It will be observed that with a milling-cutter as shown in FIGS. 5 and 6, one achieves a toothing 12 of an appearance as shown in FIG. 7 in perspective and in FIG. 8 in section. The shape of the tooth cross-section in a plane normal to the axis of pinion 6 is approximately that of an isosceles triangle, its vertex being between the two equal sides 25 and 26 and pointing towards the pinion axis 6. The other two vertices of this cross-section, which include equal angles, are connected with the lateral face 10 by rounded surfaces or (in this schematic instance) lines 24 which are approximately in the shape of an involute of a circle. The teeth terminate in the axial direction in a rounded point corresponding to the rounded surface machined at the bottom of the milling-cutter's teeth 16.

The described process achieves in a single operation a crown-toothing so that its teeth mesh correctly, that is, without impact and therefore without wear, with a setting-wheel that is itself provided with straight teeth of conventional design, where those straight teeth are at an angle of 90° with respect to said crown-toothing. Contact between teeth 12 and the setting-wheel's toothing essentially takes place along those parts of the rounded surfaces 24 which, as has already been noted, assume the shapes of involutes of circles, and thus proportional driving is ensured. On the other hand, since each tooth's symmetrical flanks or sides 25 and 26 point inward, sufficient space is provided for engaging toothing 8 of setting-wheel 7, and therefore good meshing conditions are obtained.

Finally, implementing the process is quite simple and hobbing the crown-toothing is very swift. The drawing shows a clutch-pinion with 13 crown teeth, but it is obvious that other clutch-pinion dimensions having other numbers of teeth may be made according to the same process, the thread-pitch of milling-cutter 15 of course being equal to that of the toothing which is to be hobbed.

What is claimed is:

1. A crown-toothed clutch-pinion having a generally cylindrical shape and crown-toothing extending within the outline of an annular ring at one end of said clutch-pinion, wherein each tooth in the crown-toothing is shaped substantially like a triangular-based pyramid and has a cross-section in a plane normal to the axis of the clutch-pinion, which cross-section is approximately in the shape of an isosceles triangle where the vertex between the equal sides of said triangle is located nearer the axis of the clutch-pinion than the two other vertices of said triangle which join the equal sides of said triangle with the lateral cylindrical surface of the clutch-pinion, said other vertices having rounded exterior surfaces.

2. The clutch-pinion of claim 1, wherein the rounded exterior surfaces of the other vertices of each tooth are approximately in the shape of an involute of a circle.

3. A crown-toothed clutch-pinion having a generally cylindrical shape and crown-toothing extending within the outline of an annular ring at one end of said clutch-pinion, wherein each tooth in the crown-toothing is shaped substantially like a triangular-based pyramid and has a cross-section in a plane normal to the axis of the clutch-pinion, which cross-section is approximately in the shape of an isosceles triangle where the vertex between the equal sides of said triangle is located nearer the axis of the clutch-pinion than the two other vertices of said triangle, the central edge formed between the equal sides of said triangle being inclined from the tip of the triangle towards the axis of the clutch-pinion, and wherein said two other vertices of the triangle join the equal sides of said triangle with the outside cylindrical surface of the clutch-pinion, said other vertices having rounded exterior surfaces that are approximately in the shape of an involute of a circle.

4. The clutch-pinion of claim 3 wherein said two other vertices include equal angles.

5. The clutch-pinion of claim 4 wherein the tip of said triangle is a rounded point.

* * * * *